US005307907A

United States Patent [19]

Nakamura et al.

[11] Patent Number: 5,307,907

[45] Date of Patent: May 3, 1994

[54] HYDRAULIC DAMPER

[75] Inventors: Michiya Nakamura; Kimihisa Kasajima; Hiroshi Hoya, all of Kanagawa, Japan

[73] Assignee: Atsugi Unisia Corporation, Japan

[21] Appl. No.: 896,585

[22] Filed: Jun. 10, 1992

[30] Foreign Application Priority Data

Jun. 11, 1991 [JP] Japan ............................ 3-043479[U]
Jun. 17, 1991 [JP] Japan ............................ 3-045058[U]

[51] Int. Cl.[5] ............................................ F16F 9/50

[52] U.S. Cl. ............................ 188/282; 188/299; 188/319; 188/322.15

[58] Field of Search ............... 188/279, 281, 282, 285, 188/299, 322.15, 319

[56] References Cited

U.S. PATENT DOCUMENTS

| | | | |
|---|---|---|---|
| 4,609,841 | 9/1986 | Masaki et al. | 310/75 |
| 4,645,042 | 2/1987 | Inoue et al. | 188/319 |
| 4,689,589 | 8/1987 | Ashiba et al. | |
| 4,786,034 | 11/1988 | Heess et al. | |
| 4,800,995 | 1/1989 | Bernhardt et al. | 188/299 X |
| 4,821,851 | 4/1989 | Kruckemeier et al. | 188/319 |
| 4,826,207 | 5/1989 | Yoshioka et al. | 188/319 X |
| 4,926,983 | 5/1990 | Taubitz et al. | |
| 4,953,671 | 9/1990 | Imaizumi | 188/319 X |
| 4,997,068 | 3/1991 | Ashiba | 188/319 |
| 5,044,474 | 9/1991 | deKock | 188/319 |

FOREIGN PATENT DOCUMENTS

| | | | |
|---|---|---|---|
| 0300204 | 1/1989 | European Pat. Off. | |
| 04065432 | 1/1991 | European Pat. Off. | |
| 3537180 | 4/1986 | Fed. Rep. of Germany | |
| 3542846 | 6/1987 | Fed. Rep. of Germany | |
| 3610937 | 10/1987 | Fed. Rep. of Germany | |
| 3805934 | 9/1989 | Fed. Rep. of Germany | |
| 3925470 | 3/1990 | Fed. Rep. of Germany | |
| 60-2035 | 1/1985 | Japan | |
| 61-75007 | 4/1986 | Japan | |
| 63-33038 | 3/1988 | Japan | |
| 63-33040 | 3/1988 | Japan | |
| 14935 | 1/1991 | Japan | 188/299 |
| 2159917 | 12/1985 | United Kingdom | |
| 2199920 | 7/1988 | United Kingdom | |
| 2234572 | 2/1991 | United Kingdom | |
| 2236574 | 4/1991 | United Kingdom | |

*Primary Examiner*—Robert J. Oberleitner
*Assistant Examiner*—Kevin D. Rutherford
*Attorney, Agent, or Firm*—Ronald P. Kananen

[57] ABSTRACT

A hydraulic damper is disclosed which has a contraction phase one-way passage way which allows a flow of damping fluid in contraction phase, an extension phase one-way passage way which allows a flow of damping fluid in extension phase, and a valve element in the form of a hollow control rod. The valve element has a neutral position in which both of the contraction phase and extension phase one-way passage ways are open, a first displaced position in which the extension phase one-way passage way is restricted with the contraction phase one-way passage way left open, and a second displaced position in which the contraction phase one-way passage way is restricted with said extension phase one-way passage way left open.

12 Claims, 5 Drawing Sheets

HYDRAULIC DAMPER

COPENDING RELATED APPLICATIONS

The following three corresponding Patent Applications belong to a family and disclose a hydraulic damper which is deemed to be material to examination of the claimed subject matter.

U.S. patent application Ser. No. 07/792,589 (now U.S. Pat. No. 5,178,242) filed on Nov. 15, 1991 by the same inventive entity as that of the present application;

British Patent Application No. 9124485.5 filed on Nov. 15, 1991 by the same assignee to which the present application is to be assigned; and German Patent Application P. 41 38 117.3-21 filed on Nov. 15, 1991 by the same assignee to which the present application is to be assigned.

BACKGROUND OF THE INVENTION

The present invention relates to a hydraulic damper for a vehicular suspension system.

Hydraulic dampers used in vehicular suspension systems cannot cope well with input from the road surface such that if a hydraulic damper is set to a hard damping force range position and undergoes extension phase, an impact due to engagement of the associated tire with a bump of the road surface is directly transmitted to the vehicle body, while if the hydraulic damper is set to the hard damping force range position and undergoes contraction phase, the hydraulic dampler cannot extend enough to cope with a pot hole of the road surface, subjecting the vehicle body to a rapid drop.

An object of the present invention is to provide a hydraulic damper wherein the damping force characteristic for one of contraction and extension can be varied in an independent manner from the damping force characteristic for the other phase.

SUMMARY OF THE INVENTION

According to the present invention, there is provided a hydraulic damper comprising:

a cylinder;

a hollow rod;

a piston secured on said hollow rod and divides said cylinder into first and second chambers containing dampling fluid;

an extension phase damping valve for damping in the extension phase;

a contraction phase damping valve for damping in the contraction phase;

a contraction phase one-way passage way via which said second chamber is connectable with said first chamber in the contraction phase;

an extension phase one-way passage way via which the first chamber is connectable with the second chamber in the extension phase; and a valve element having a neutral position in which both of said contraction phase and extension phase one-way passage ways are open, said valve element having a first displaced position in which said extension phase one-way passage way is restricted with said contraction phase one-way passage way left open, said valve element having a second displaced position in which said contraction phase one-way passage way is restricted with said extension phase one-way passage way left open.

DETAILED DESCRIPTION OF THE INVENTION

Figure 1:
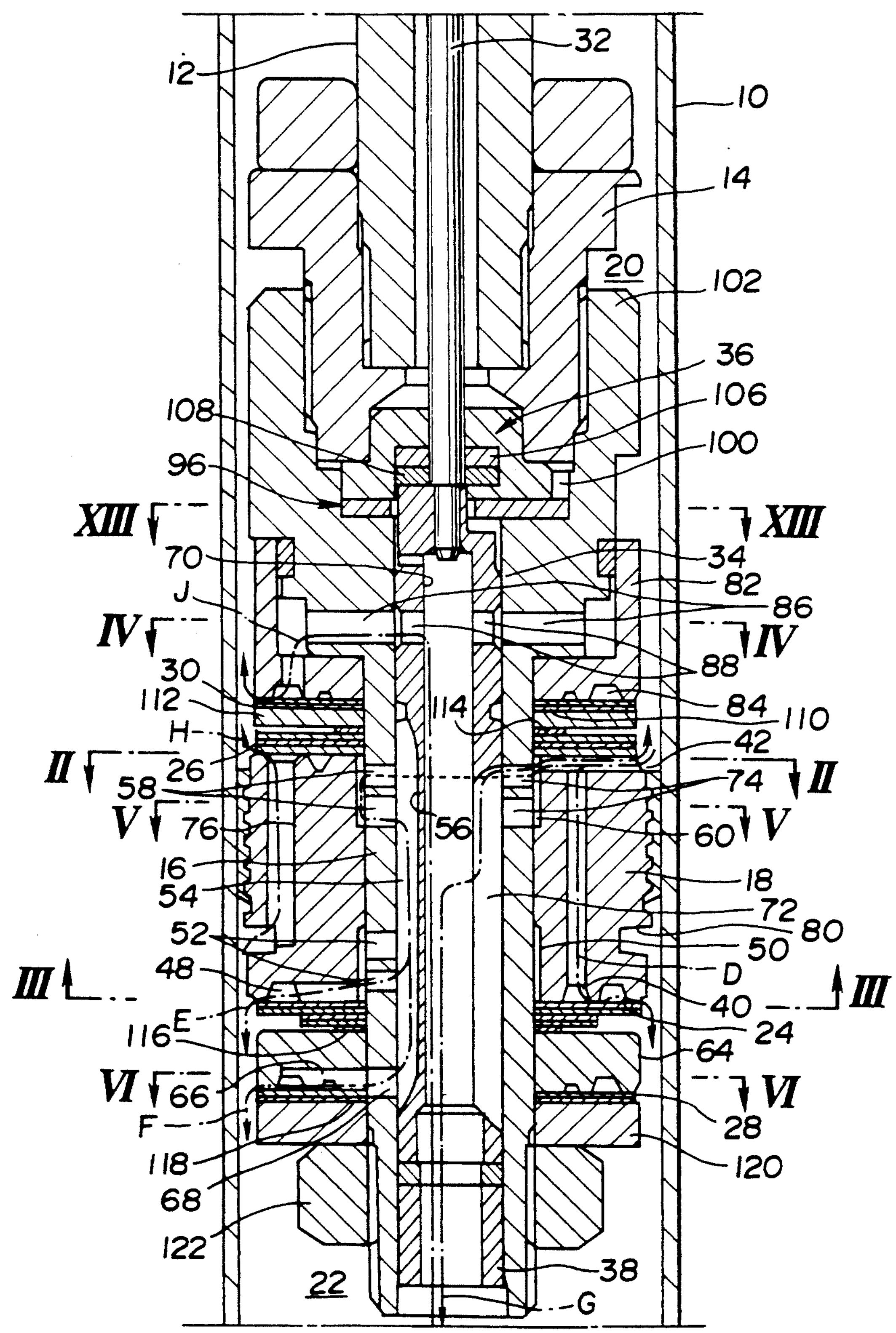
FIG. 1 is a fragmentary diagrammatic view resulting from combining different sections taken through the lines I—I shown in FIGS. 2, 3 and 13, showing a preferred embodiment of a hydraulic damper according to the present invention.

An adjustable hydraulic damper illustrated in section in FIG. 1 generally comprises a working cylinder 10, a piston rod assembly including a hollow piston rod 12, a hollow. rebound stopper 14 threadedly secured on the end of the piston rod 12 and a hollow rod 16 threadedly secured on the rebound stopper 14, and a damping piston assembly secured on the hollow rod 16. The piston assembly includes a piston 18. The piston 18 divides the interior of the cylinder 10 into upper and lower chambers 20 and 22 containing hydraulic damping fluid. The piston 18 is fitted with an extension phase damping valve 24, a contraction phase damping valve 26, an extension phase one-way valve 28 and a contraction phase one-way valve 30. A control rod assembly includes a rod 32 and a hollow control rod 34 secured on the end of the rod 32. The rod 32 is rotatably mounted within the hollow interior of the piston rod 12 and has its lower end portion rotatably supported by a bushing 36 disposed between the rebound stopper 14 and the hollow rod 16. The hollow control rod 34 which serves as a valve element is rotatably mounted within the cylindrical bore of the hollow rod 16. The lower end of the hollow control rod 34 has a bushing 38.

Figure 2:
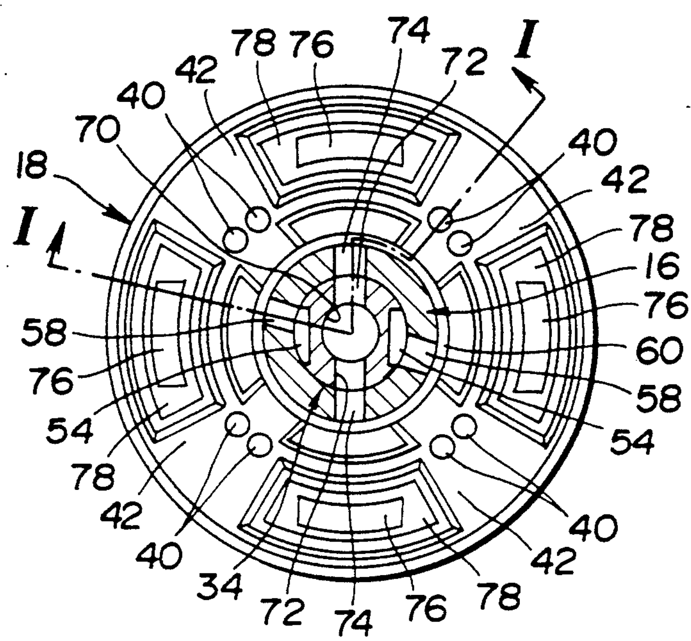
FIG. 2 is a section taken through the line II—II in FIG. 1.
Figure 3:
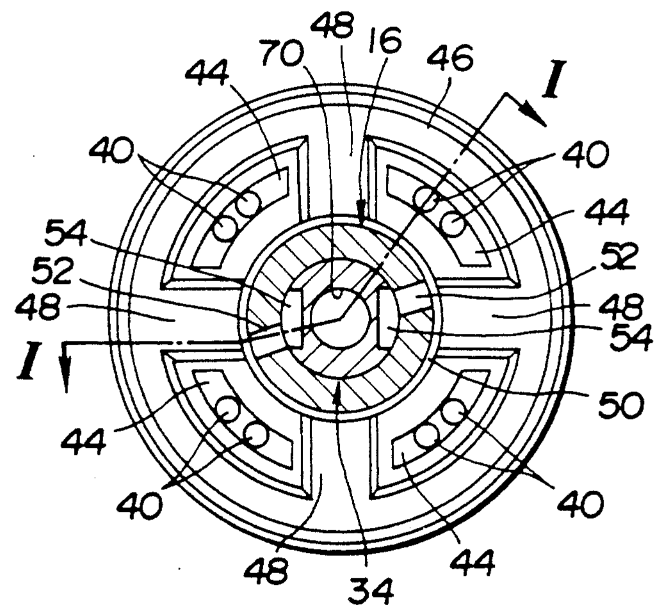
FIG. 3 is a section taken through the line III—III in FIG. 1.

The piston 18 has four pairs of extension phase bores 40 and the extension phase damping valve 24 for damping in the extension phase, the valve being in the form of a stack of disc springs. As best seen in FIGS. 2 and 3, each of the four pairs of extension phase bores 40 have upper ends opening to one of four radial passages 42 which are provided in the upper axial end of the piston 18 and adjacent the contraction phase damping valve 26. The lower ends of each of the four pairs of extension phase bores 40 open to one of four equi-angularly distant recesses 44 which are provided in the lower axial end of the piston 18 and adjacent the extension phase damping valve 24. An annular recess 46 is provided in the lower axial end of the piston 18 and adjacent the extension phase damping valve 24 in such a manner as to surround the four equi-angularly distant recesses 44. The four equi-angularly distant recesses 44 communicate with the upper chamber 20 through the extension phase bores 40 and the radial passages 42. The annular recess 46 communicates with the upper chamber 20 through radial recesses 48, an annular passage 50, discharge bores 52, axial passages 54 formed between the cylindrical interior of the hollow rod 16 and grooves 56, inlet bores 58, an annular passage 60 and the radial passages 42. A valve body 64 for the extension phase one-way valve 28 is secured on the hollow rod 16. In the lower axial end of this valve body 64, radial recesses 66 are provided adjacent the extension phase one-way valve 28. These radial recesses 66 communicate with the upper chamber 20 through discharge bores 68, the axial passages 54, the inlet bores 58, the annular passage 60 and the radial passages 42. The hollow control rod 34 has a central bore 70 opening to the lower chamber 22. The central bore 70 communicates with the upper chamber 20 through axial slots 72, bypass bores 74, the annular passage 60 and the radial passages 42.

For extension phase, there are four passage ways open when the hollow control rod 34 assumes the neutral position as shown in FIGS. 2, 3, 7, 8 and 9. Namely, these four passage ways are;

A first extension phase passage way D which allows a flow of damping fluid through the extension phase bores 40 to the four equi-angularly distant recesses 44 and into the lower chamber 22 deflecting open the extension phase damping valve 24;

A second extension phase passage way E which allows a flow of damping fluid to the annular recess 46 through the inlet bores 58, the axial passages 54 and the discharge bores 52 and into the lower chamber 22 deflecting open the extension phase damping valve 24;

A third extension phase one-way passage way F which allows a flow of damping fluid to the radial recesses 66 through the inlet bores 58, the axial passages 54 and the discharge bores 68 and into the lower chamber 22 deflecting open the one-way valve 28; and A fourth or bypass passage way G which allows a flow of damping fluid into the lower chamber 22 through the bypass bores 74, the axial slots 72 and the central bores 70.

For the contraction phase, the piston 18 has four contraction phase bores 76 and the contraction phase damping valve 26 is also in the form of a stack of disc springs. As best seen in FIG. 2, each of the four contraction phase bores 76 has an upper end opening to one of four equi-angularly distant recesses 78 which are provided in the upper axial end of the piston and adjacent the contraction phase damping valve 26. The contraction phase bores 76 have lower ends communicating with a circumferential inlet groove 80 opening to the lower chamber 22. A valve body 82 for the contraction phase one-way valve 30 is secured on the hollow rod 16. In the lower axial end of this valve body 82, an annular recess 84 is provided adjacent the contraction phase one-way valve 30. This annular recess 84 communicates with the lower chamber 22 through transverse bores 86, discharge bores 88 and the central bore 70.

For the contraction phase, there are three passage ways open when the hollow control rod 34 assumes the neutral position as shown in FIGS. 2, 3, 7, 8 and 9. Namely, the three passage ways are;

A first contraction phase passage way H which allows a flow of damping fluid through the contraction phase bores 78 to the equi-angularly distant recesses 78 and into the upper chamber 20 deflecting open the contraction phase damping valve 26;

A second contraction phase one-way passage way J which allows a flow of damping fluid through the central bore 70, the discharge bores 88, the transverse bores 86 to the annular recess 84 and into the upper chamber 20 deflecting open the contraction phase one-way valve 30; and The before-mentioned bypass passage way G.

Figure 4:
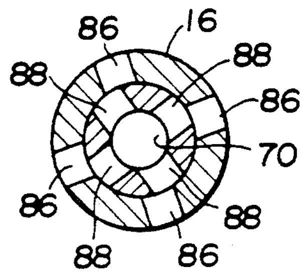
FIG. 4 is a diagrammatic section taken through the line IV—IV in FIG. 1 showing a control rod assembly in a first angularly displaced position.
Figure 5:
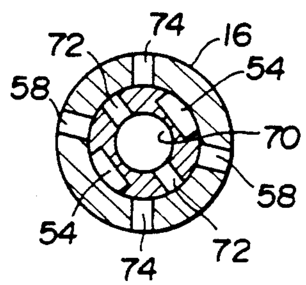
FIG. 5 is a diagrammatic section taken through the line V—V in FIG. 1 showing the control rod assembly in the first angularly displaced position.
Figure 6:
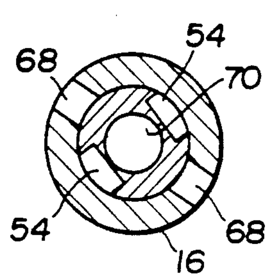
FIG. 6 is a diagrammatic section taken through the line VI—VI in FIG. 1; showing the control rod in the first angularly displaced position
Figure 7:
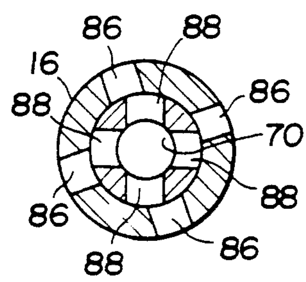
FIGS. 7, 8 and 9 are similar views to FIGS. 4, 5 and 6, but showing the control rod assembly in a neutral position.
Figure 8:
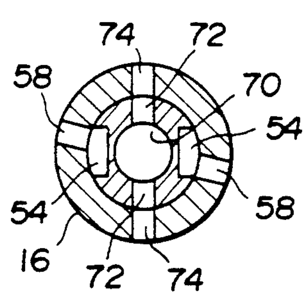
Figure 9:
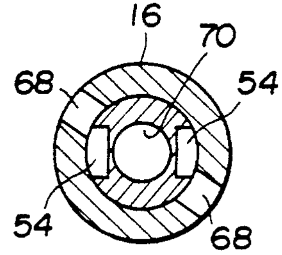
Figure 15:
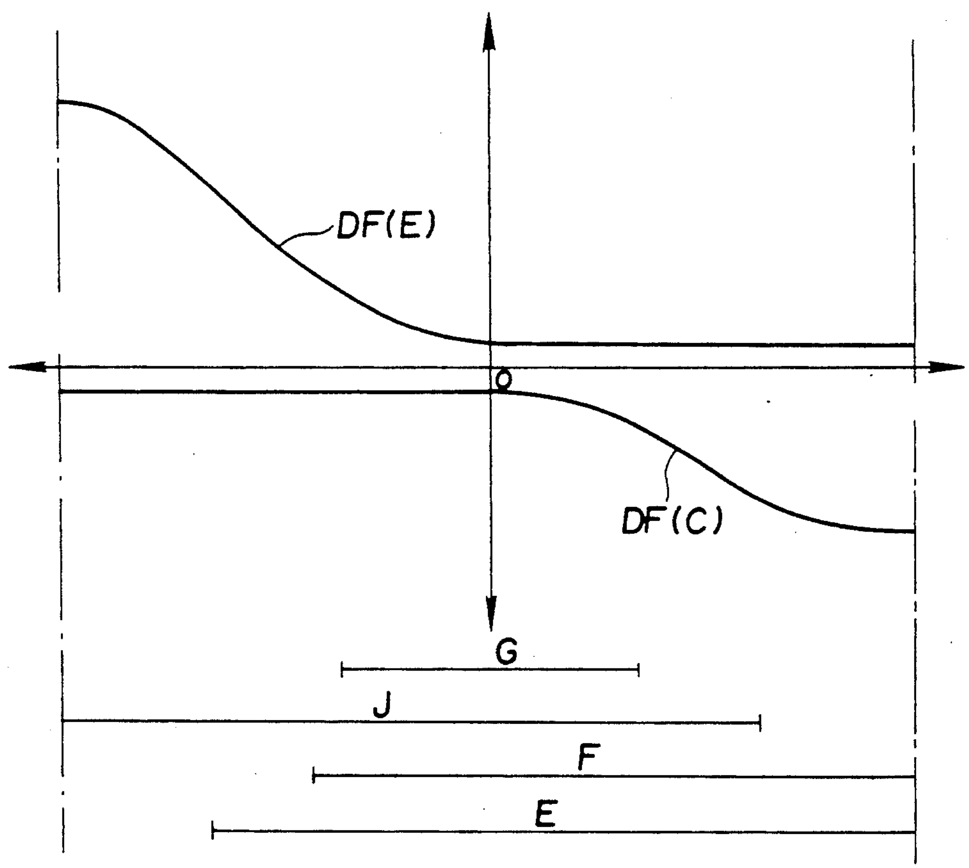
FIG. 15 is a diagrammatic graphical representation of the variation of damping force versus angular displacement of the control rod assembly with the same piston speed together with a bar graph, at the bottom, showing opening ranges of respective passage ways in relation to angular position of the control rod assembly.

If, with a soft contraction phase maintained, a hard extension phase is desired, the hollow control rod 34 is rotated counterclockwise from the neutral position as shown in FIGS. 7 to 9 to a first angularly displaced position as shown in FIGS. 4 to 6. In this first angularly displaced position, the bypass passage way G and the extension phase passage ways E and F are closed although the contraction phase passage way J remains open. At the left-hand half of FIG. 15, there is shown variation of a damping force DF(E) for extension phase and a damping force DF(C) for contraction phase in relation to various angular positions from the neutral position to the first angularly displaced position. Since the contraction phase passage way J is left open, the damping force DF(C) for contraction phase is kept low. As shown in FIG. 15, the damping force DF(E) for extension phase gradually increases owing to this counterclockwise motion from the neutral position toward the first angularly displaced position.

Figure 10:
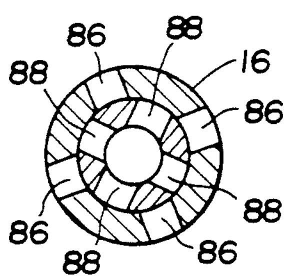
FIGS. 10, 11 and 12 are similar views to FIGS. 4, 5 and 6, but showing the control rod assembly in a second angular displaced position.
Figure 11:
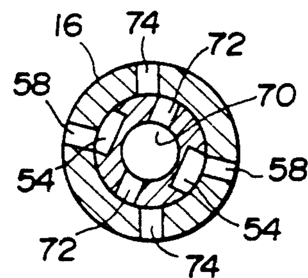
Figure 12:
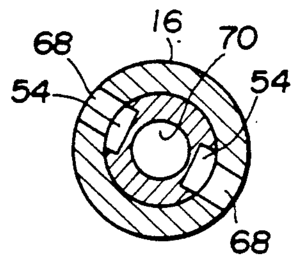

If, with a soft extension phase maintained, a hard contraction phase is desired, the hollow control rod 34 is rotated clockwise from the neutral position as shown in FIGS. 7 to 9 to a second angularly displaced position as shown in FIGS. 10 to 12. In this second angularly displaced position, the bypass passage way G and the contraction phase passage way J are closed although the extension phase passage way E and F remain open. At the right-hand half of FIG. 15, there is shown variation of the damping force DF(E) for extension phase and the damping force DF(C) for contraction phase in relation to various angular positions from the neutral position to the second angularly displaced position. Since the extension phase passage ways E and F are left open, the damping force DF(E) for extension phase is kept low. As shown in FIG. 15, the damping force DF(C) for contraction phase gradually increases owing to this clockwise motion from the neutral position to the second angularly displaced position.

The control rod assembly including the rod 32 and the hollow control rod 34 is actuated by a stepper motor provided in the upper end of the rod 32. This angular movement may be effected either hydraulically, pneumatically or electromagnetically.

Figure 13:
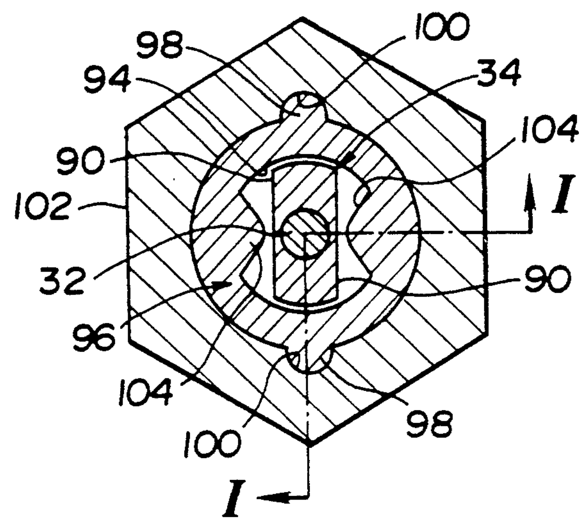
FIG. 13 is a section taken through the line XIII—XIII in FIG. 1.
Figure 14:
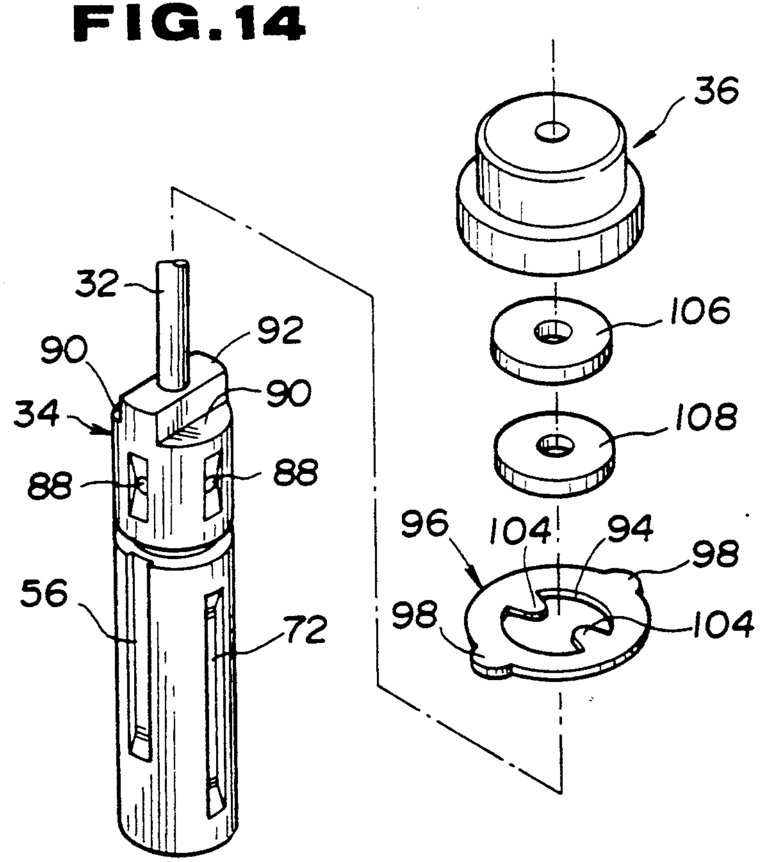
FIG. 14 is an exploded view of a portion of the control rod assembly.

Referring to FIGS. 1, 13 and 14, the hollow control rod 34 has an upper end portion formed with two cutouts 90 to provide a diametrical land 92 with two parallel walls. The diametrical land 92 is received in a key opening 94 of a positioning plate 96. The positioning plate 96 has two diametrically opposed projections 98 received in the corresponding two grooves 100 of an upper stud portion 102 of the hollow rod 16. The positioning plate 96 has inwardly projecting stoppers 104 which abut the diametrical land 92 to limit angular motion of the hollow control rod 34. The positioning plate 96 is interposed between the bushing 36 and the stud portion 102 of the hollow control rod 16. For smooth motion and axial positioning of the hollow control rod 34 within the cylindrical interior of the hollow rod 16, two kinds of thrust washers 106 and 108 are disposed between the bushing 36 and the top end of the diametrical land 92 and the bushing 38 supports the lower end of the hollow control rod 34. The use of the positioning plate 96 and the diametrical land 92 assures easy positioning of the hollow control rod 34 without exerting any bending stress on the hollow control rod 34.

In assembly, after mounting the control rod assembly 32, 34 within the piston rod assembly 12, 14, 16, the piston assembly is mounted in the following manner. The valve body 82, the contraction phase one-way valve 30, a washer 110, a collar 112, a washer 114, the contraction phase damping valve 26, the piston 18, the extension phase 24, a washer 116, the valve body 64, the extension phase one-way valve 28, a washer 118 and a collar 120 are mounted around the hollow rod 16 and fixedly secured thereon by tightening a nut 122.

What is claimed is:

1. A hydraulic damper, comprising:

a cylinder;

a hollow rod;

a piston secured on said hollow rod dividing said cylinder into first and second chambers containing damping fluid;

an extension phase damping valve for damping in the extension phase;

a contraction phase damping valve for damping in the contraction phase;

a contraction phase one-way passage way via which said second chamber is connectable with said first chamber in the contraction phase;

an extension phase one-way passage way via which the first chamber is connectable with the second chamber in the extension phase; and a valve element rotatably disposed in said hollow rod and having a neutral position in which both of said contraction phase and extension phase one-way passage ways are open, said valve element being angularly displaceable in a first rotational direction from said neutral position to a first displaced position in which said extension phase one-way passage way is closed with said contraction phase one-way passage way left open, said valve element being angularly displaceable in a second rotational direction, opposite to said first rotational direction, to a second displaced position in which said contraction phase one-way passage way is closed with said extension phase one-way passage way left open;

wherein said valve element is in the form of a hollow control rod rotatably mounted within the interior of said hollow rod, said hollow control rod having an axial end formed with a diametrical land received in a key opening of a positioning plate fixedly secured on said hollow rod, the diametrical land and key opening cooperating with each other to limit motion of said hollow control rod within a predetermined range.

2. A hydraulic damper as claimed in claim 1, wherein said first and second chambers are upper and lower chambers, respectively.

3. A hydraulic damper comprising:

a cylinder;

a hollow rod with a cylindrical interior;

a piston secured on said hollow rod dividing said cylinder into first and second chambers containing damping fluid;

an extension phase damping valve for damping in the extension phase;

a contraction phase damping valve for damping in the contraction phase;

a contraction phase one-way passage way via which said second chamber is connectable with said first chamber in the contraction phase;

an extension phase one-way passage way via which said first chamber is connectable with said second chamber in the extension phase; and a valve element in the form of a hollow control rod rotatably disposed in said hollow rod, said valve element having a central bore having one end communicating with said second chamber, said central bore forming a part of said contraction phase one-way passage way, said valve element being formed with at least one groove, each groove cooperating with said cylindrical interior of said hollow rod to form a transfer passage which forms a part of said extension phase one-way passage way, said valve element having a neutral position in which both of said contraction phase and extension phase one-way passage ways are open, said valve element being angularly displaceable in a first rotational direction from said neutral position to a first displaced position in which said extension phase one-way passage way is closed with said contraction phase one-way passage way left open, said valve element being angularly displaceable in a second rotational direction, opposite to said first rotational direction, to a second displaced position in which said contraction phase one-way passage way is closed with said extension phase one-way passage way left open.

4. A hydraulic damper as claimed in claim 3, wherein said hollow control rod serving as said valve element is formed with a discharge bore communicating with said central bore, while said hollow rod is formed with a transverse bore which has an opening within said cylindrical interior, and said discharge bore and said transverse bore cooperate with each other to form a part of said contraction phase one-way passage.

5. A hydraulic damper as claimed in claim 4, wherein said hollow rod is formed with an inlet bore which communicates with said first chamber and has an opening within said cylindrical interior, said hollow rod is formed also with a discharge bore which has an opening within said cylindrical interior, and said inlet bore and said discharge bore of said hollow rod cooperate with said transfer passage.

6. A hydraulic damper as claimed in claim 5, wherein said hollow rod is formed with a bypass bore which communicates with said first chamber and has an opening within said cylindrical interior, said control rod serving as said valve element is formed with a slot communicating with said central bore, and said bypass bore cooperates with said slot.

7. A hydraulic damper as claimed in claim 5, wherein when said valve element is in said neutral position thereof, said valve element uncovers said inlet bore of said hollow rod to allow communication with said transfer passage and uncovers said discharge bore of said hollow rod to allow communication with said transfer passage, while said valve element uncovers said transverse bore of said hollow rod to allow communication with said discharge bore of said valve element.

8. A hydraulic damper as claimed in claim 6, wherein when said valve element is in said neutral position, said valve element uncovers said bypass bore to allow communication with said slot.

9. A hydraulic damper as claimed in claim 7, wherein when said valve element is in said first displaced position, said valve element covers said transverse bore of said hollow rod to prohibit communication with said discharge bore of said valve element, while said valve element uncovers said inlet bore of said hollow rod to allow communication with said transfer passage and uncovers said discharge bore of said hollow rod to allow communication with said transfer passage.

10. A hydraulic damper as claimed in claim 7, wherein when said valve element is in said second displaced position, said valve element covers said inlet bore of said hollow rod to prohibit communication with said transfer passage and covers said discharge bore of said hollow rod to prohibit communication with said transfer passage, while said valve element uncovers said transverse bore of said hollow rod to allow communication with said discharge bore of said valve element.

11. A hydraulic damper as claimed in claim 8, wherein when said valve element is in said first displaced position, said valve element covers said transverse bore of said hollow rod to prohibit communication with said discharge bore of said valve element, said valve element uncovers said discharge port of said hollow rod to allow communication with said transfer passage, and said valve element covers said bypass bore to prohibit communication with said slot.

12. A hydraulic damper as claimed in claim 8, wherein when said valve element is in said second displaced position, said valve element covers said inlet bore of said hollow rod to prohibit communication with said transfer passage and covers said discharge port of said hollow rod to prohibit communication with said transfer passage, said valve element uncovers said transverse bore of said hollow rod to allow communication with said discharge bore of said valve element, and said valve element covers said bypass bore to prohibit communication with said slot.

* * * * *